July 30, 1929. F. T. COPE ET AL Re. 17,388

ELECTRIC FURNACE

Original Filed March 6, 1926 3 Sheets-Sheet 1

Inventors

Frank T. Cope and

By Roland F. Benzinger

Frease and Bond Attorneys

July 30, 1929. F. T. COPE ET AL Re. 17,388

ELECTRIC FURNACE

Original Filed March 6, 1926 3 Sheets-Sheet 2

Inventors
Frank T. Cope and
Roland F. Benzinger
By Freeman and Bond Attorneys

July 30, 1929. F. T. COPE ET AL Re. 17,388

ELECTRIC FURNACE

Original Filed March 6, 1926 3 Sheets-Sheet 3

Inventors
Frank T. Cope and
Roland F. Benzinger
By Frease and Bond Attorneys

Reissued July 30, 1929.

Re. 17,388

UNITED STATES PATENT OFFICE.

FRANK T. COPE AND ROLAND F. BENZINGER, OF SALEM, OHIO, ASSIGNORS TO THE ELECTRIC FURNACE COMPANY, OF SALEM, OHIO, A CORPORATION OF OHIO.

ELECTRIC FURNACE.

Original No. 1,647,726, dated November 1, 1927, Serial No. 92,695, filed March 6, 1926. Application for reissue filed August 20, 1928. Serial No. 300,914.

The invention relates to electric furnaces of the metallic resistor type and more particularly to means for supporting sinuous resistor grids, particularly beneath the hearth of the furnace.

In the type of furnace to which the invention is especially adaptable the working hearth of the furnace is made up of plates of heat resisting alloy supported above the base of the furnace upon refractory piers, the metallic resistors or grids being located beneath said hearth plates.

It is usual practice for these resistor grids to rest directly upon the floor or base of the furnace, but owing to the fact that spaces must be left between the adjacent edges of the hearth plates, in order to provide for expansion under high temperature, a considerable amount of scale, from the articles being heated or heat treated upon said hearth plates, drops through these spaces upon the floor or base of the furnace, frequently short circuiting the metallic resistor.

The object of the present improvement is to provide means for supporting these metallic resistors or grids at a point spaced above the floor or base of the furnace whereby scale dropping through the spaces between the hearth plates will slide or fall off of the sinuous resistor upon the floor or base of the furnace, preventing danger of short circuiting of the resistor; means being provided for easily removing this accumulation of scale from the floor before it has become piled high enough to contact with the resistor.

The above and other objects may be attained by providing main piers for supporting the edge portions of the hearth plates and secondary piers for supporting intermediate portions of the hearth plates, the sinuous resistor extending substantially from one main pier to the next adjacent main pier, certain portions of the intermediate piers being cut out to support alternate loops of the resistor while the intermediate loops thereof are supported upon rods or pins extended between adjacent piers.

Figure 1:
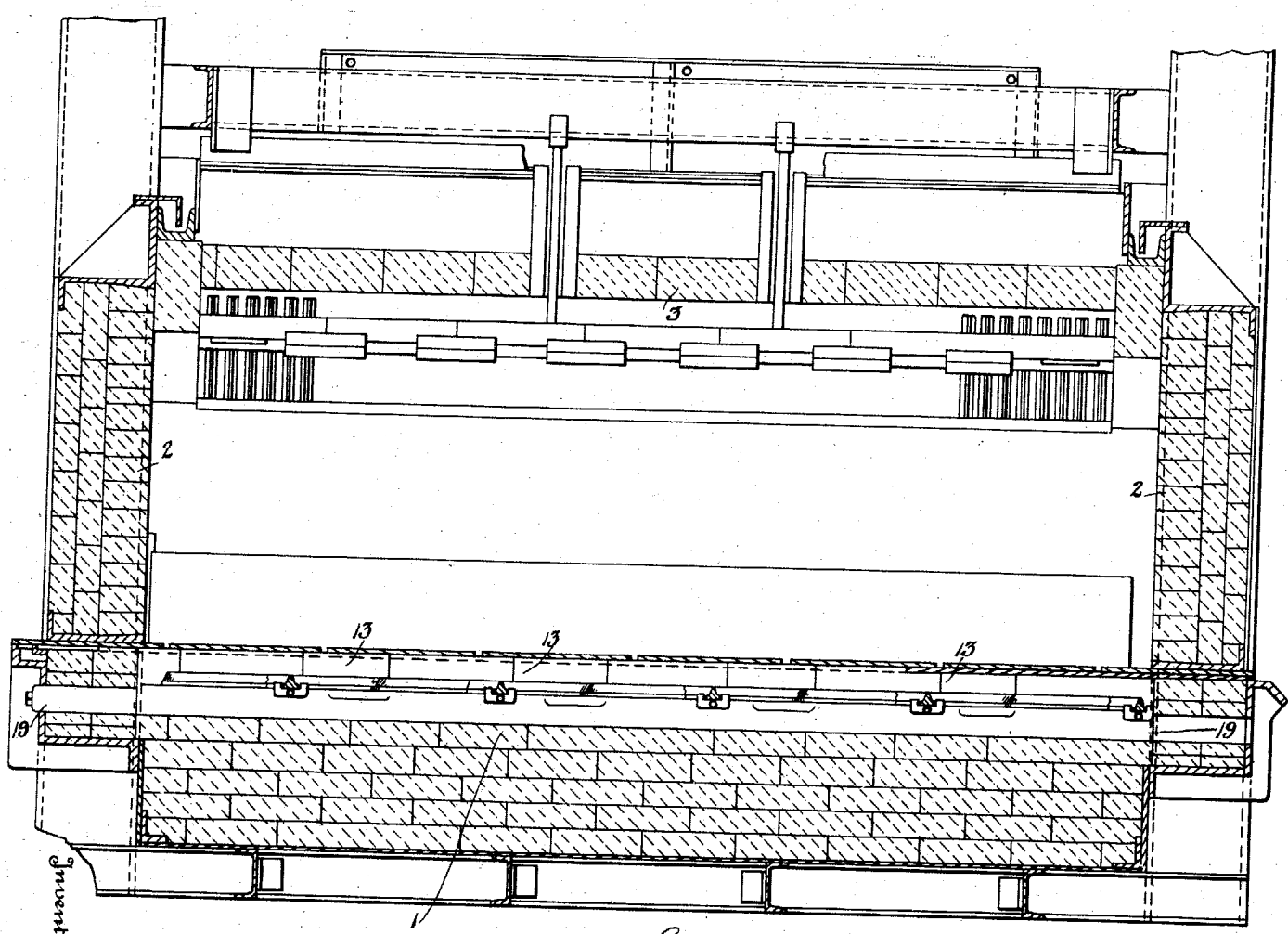
Figure 2:
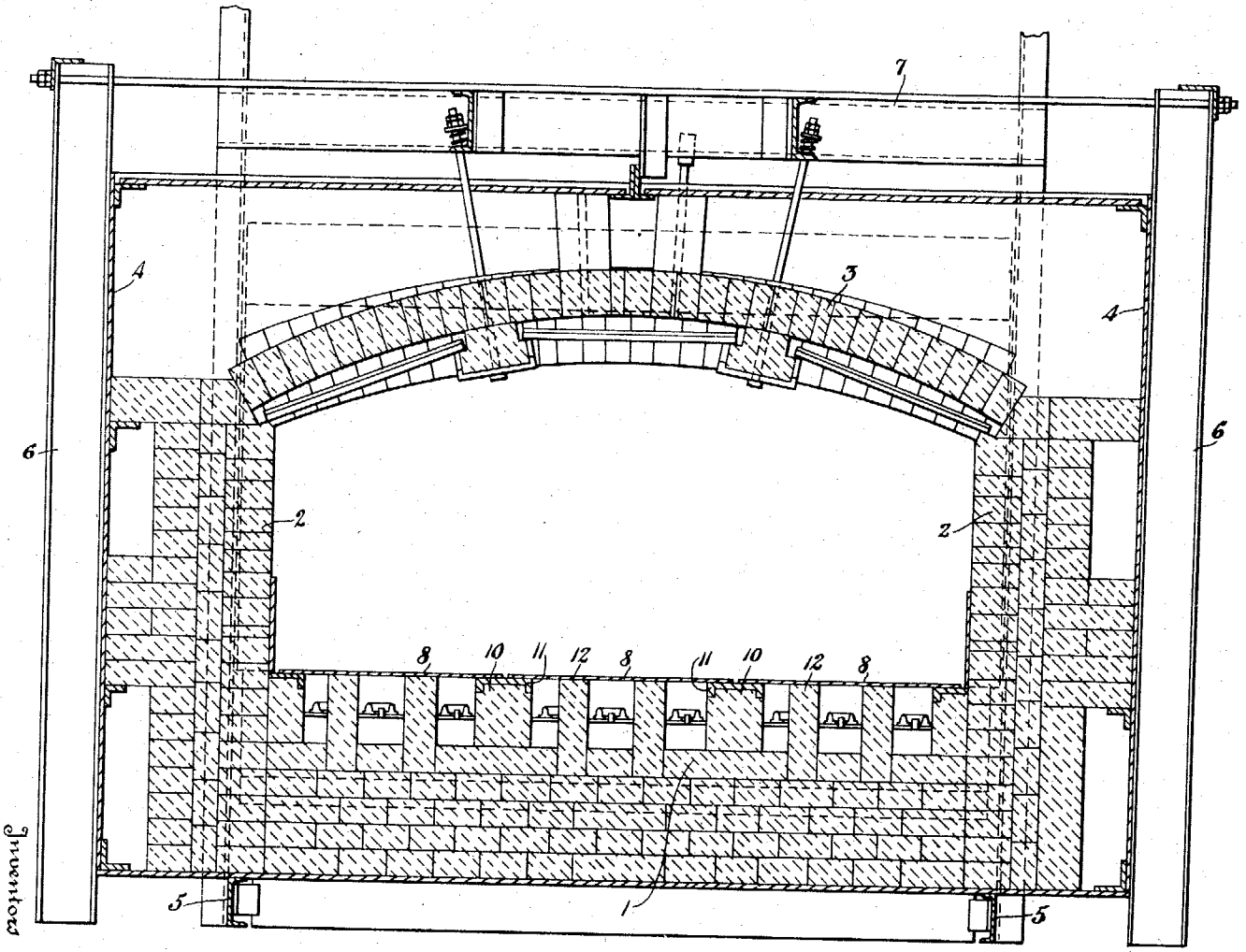
Figure 3:
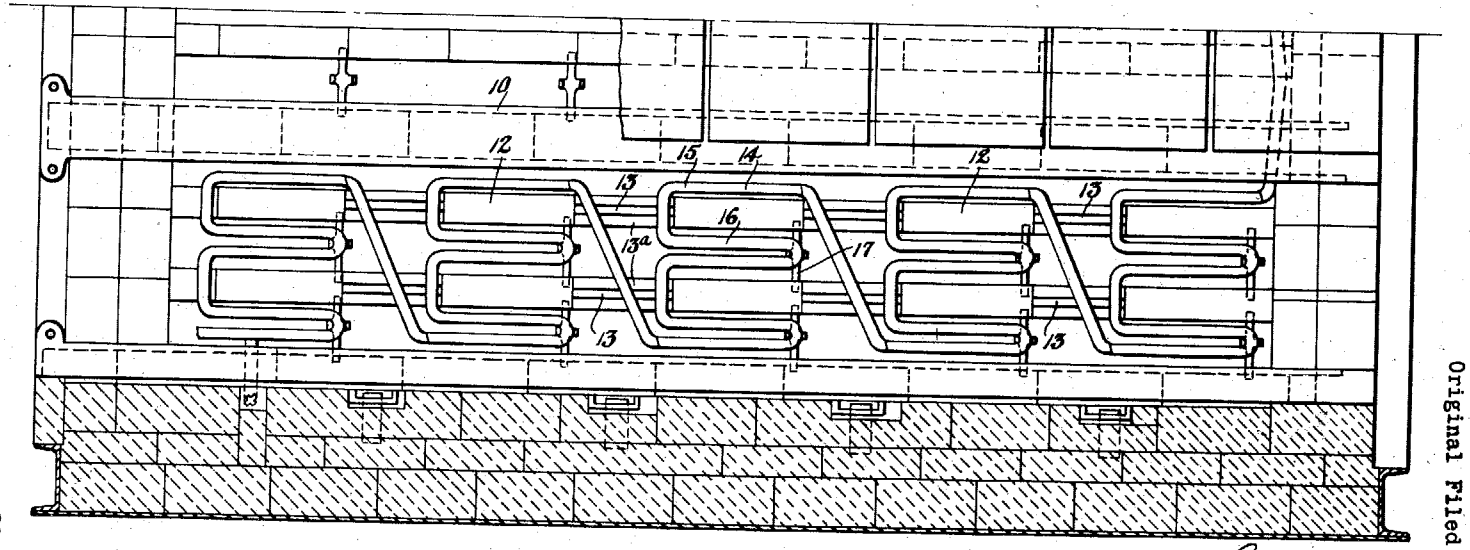
Figure 5:
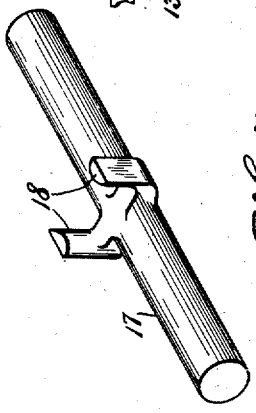
Figure 4:
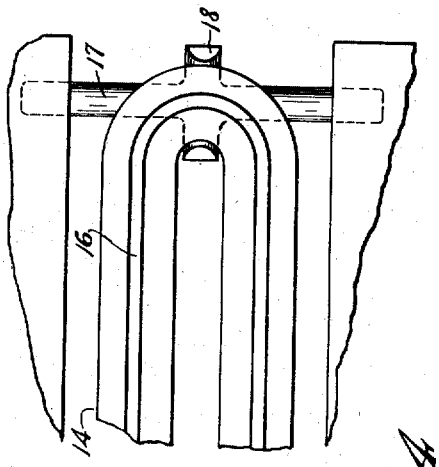

An embodiment of the invention is illustrated in the accompanying drawings, in which Figure 1 is a vertical longitudinal section through a furnace embodying the invention;

Fig. 2, a transverse sectional view of the same;

Fig. 3, a fragmentary plan sectional view showing portions of the resistor and hearth plates removed for the purposes of illustration;

Fig. 4, an enlarged plan sectional view of a portion of the resistor and one of the supporting rods;

Fig. 5, a detached perspective view of the supporting rod, and

Figure 6:
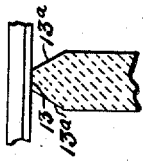

Fig. 6, a detail sectional view through the cut out portion of one of the piers showing the beveled upper edge thereof.

Similar numerals refer to similar parts throughout the drawings.

The furnace may comprise the base 1, side walls 2 and roof 3, formed of suitable refractory material and enclosed as by the metal casing 4. The usual structural members 5 may be provided for supporting the brick work, which may be reinforced by the vertical structural members 6 which carry the roof supporting structure 7.

The working hearth of the furnace is composed of plates 8 of heat resisting metal, supported upon piers extended upward from the base or floor 1.

These piers are preferably formed of refractory material and may comprise the longitudinal main piers 10, having heat resisting alloy caps 11 supporting the edge portions of the hearth plates, and the secondary piers 12 which are located between the main piers to reduce the plate span between the same, for the purpose of overcoming distortion or sagging of the hearth plates when heavily loaded under high temperatures.

With this construction of main and secondary piers a space is left between the piers in which the resistors may be mounted. In carrying out the present invention each of the secondary piers 12 has its upper portion cut out at spaced intervals as shown at 13, to a point midway between the hearth plates and the brick floor 1. The resistors, indicated generally at 14 are of sinuous shape and may comprise alternate wide and narrow loop portions 15 and 16 respectively. These wide loops 15 are supported in the cut out portions 13 of the secondary piers, the narrow loops 16 being located in the spaces between the piers.

The upper half of each cut out portion 13 is beveled as shown at 13[a] in order to provide no shoulder to retain scale which drops from the articles being heated, through the hearth, these beveled edges upon the resistor supports causing the scale to drop upon the floor, thus assuring no possibility of short circuiting of any portions of the resistors by accumulation of scale thereon.

For the purpose of supporting these narrow loops, rods 17, of suitable heat resisting metal, are located transversely between the piers and provided with spaced upright prongs 18 between which is received the end portion of each loop 16.

The resistor is thus supported free of the charge, substantially midway between the floor and hearth plates and since the same is of substantially triangular cross sectional shape with inverted V-sides tapered upward away from the floor wall to form an apex directed toward the charge; so that any scale which drops thereon will slide or drop off and be deposited on the adjacent floor wall beneath the resistor, preventing danger of short circuiting.

In order to keep the floor of the furnace clean a small opening 19 may be provided at each end wall of the furnace for the purpose of entering an air hose or cleaning tool for removing the accumulation of scale from time to time.

We claim:

1. An electric furnace including a floor, piers extended upward from the floor, a hearth comprising a plurality of plates mounted upon said piers, and a resistor grid supported between the piers and intermediate the hearth and floor.

2. An electric furnace including a floor, piers extended upward from the floor, a hearth mounted upon said piers, and a resistor grid supported between the piers and intermediate the hearth and floor.

3. An electric furnace including a floor, piers extended upward from the floor, a hearth mounted upon said piers, certain of said piers having cut out portions, and a sinuous resistor grid having loops supported in said cut out portions and being spaced intermediate the hearth and floor.

4. An electric furnace including a floor, piers extended upward from the floor, a hearth comprising a plurality of plates, mounted upon said piers, certain of said piers having cut out portions, and a sinuous resistor grid having loops supported in said cut out portions and being spaced between the hearth and floor.

5. An electric furnace including a floor, piers extended upward from the floor, a hearth mounted upon said piers, supporting rods located between the piers intermediate the hearth and floor, and a resistor supported upon said rods.

6. An electric furnace including a floor, piers extended upward from the floor, a hearth comprising a plurality of plates mounted upon said piers, supporting rods located between the piers intermediate the hearth and floor, and a resistor supported upon said rods.

7. An electric furnace including a floor, piers extended upward from the floor, a hearth mounted upon said piers, certain of the piers having cut out portions, supporting rods located between the piers, and a sinuous resistor grid having certain loops supported in said cut out portions and certain other loops supported upon said rods, and being spaced between the hearth and floor.

8. An electric furnace including a floor, piers extended upward from the floor, a hearth comprising a plurality of plates mounted upon said piers, certain of the piers having cut out portions, supporting rods located between the piers, and a sinuous resistor grid having certain loops supported in said cut out portions and certain other loops supported upon said rods, and being spaced between the hearth and floor.

9. An electric furnace including a floor, piers extended upward from the floor, a hearth mounted upon said piers, certain of the piers having cut out portions, supporting rods located between the piers, and a sinuous resistor grid having certain loops supported upon said cut out portions and certain other loops supported at their ends only upon said rods.

10. An electric furnace including a floor, piers extended upward from the floor, a hearth mounted upon said piers, certain of the piers having cut out portions, supporting rods located between the piers, and a sinuous resistor grid having certain loops supported upon said cut out portions and certain other loops supported at their ends only upon said rods, said rods having prongs between which the end of the loop is received.

11. An electric furnace for heating a charge, including a wall, a resistor grid adjacent the wall and spaced from the charge, the resistor grid being of substantially triangular cross section and the apex of the triangle being directed away from the wall toward the charge.

12. An electric furnace for heating a charge, including a wall, a resistor grid adjacent the wall and spaced from the charge, the resistor grid having V-sides tapered to an apex directed away from the wall toward the charge.

13. An electric furnace including a floor, a hearth spaced above the floor and a resistor grid of substantially triangular cross section supported intermediate the hearth and floor whereby scale falling from the hearth and striking the resistor will slide off of the resistor upon the floor.

14. An electric furnace including a floor, a hearth spaced above the floor, and a resistor grid supported intermediate the hearth and floor and provided with inverted V sides whereby scale falling from the hearth and striking the resistor will slide off of the resistor upon the floor.

FRANK T. COPE.
ROLAND F. BENZINGER.